US010787325B1

(12) United States Patent
Pippin (10) Patent No.: US 10,787,325 B1
(45) Date of Patent: Sep. 29, 2020

(54) AUTOMATED CONTAINER LOADER AND METHOD (71) Applicant: Siemens Logistics LLC, DFW Airport, TX (US)

(72) Inventor: James M. Pippin, Keller, TX (US)

(73) Assignee: Siemens Logistics LLC, DFW Airport, TX (US)

(*) Notice: Subject to any disclaimer, the term of this patent is extended or adjusted under 35 U.S.C. 154(b) by 0 days.

(21) Appl. No.: 16/541,678

(22) Filed: Aug. 15, 2019

(51) Int. Cl.
B65G 67/08 (2006.01)
B65G 57/03 (2006.01)
B65G 67/20 (2006.01)
G05B 15/02 (2006.01)

(52) U.S. Cl.
CPC ............ B65G 67/08 (2013.01); B65G 57/03 (2013.01); B65G 67/20 (2013.01); G05B 15/02 (2013.01)

(58) Field of Classification Search
CPC ......... B65G 67/08; B65G 67/20; B65G 57/03
See application file for complete search history.

(56) References Cited

U.S. PATENT DOCUMENTS

| 1,805,489 | A |   | 5/1931  | Kerr              |          |
|-----------|---|---|---------|-------------------|----------|
| 2,328,397 | A |   | 8/1943  | Neuman            |          |
| 2,572,945 | A |   | 10/1951 | Quesnoit          |          |
| 2,662,650 | A |   | 12/1953 | Russell           |          |
| 2,916,169 | A |   | 12/1959 | De Witt           |          |
| 2,923,423 | A |   | 2/1960  | Maney             |          |
| 3,186,566 | A |   | 6/1965  | Spinanger         |          |
| 3,435,950 | A |   | 4/1969  | Lew               |          |
| 3,704,798 | A |   | 12/1972 | Carpenture, Jr. et al. | |
| 3,763,792 | A |   | 10/1973 | Webb              |          |
| 3,779,404 | A | * | 12/1973 | McWilliams        | B65G 67/08 414/344 |
| 3,827,585 | A | * | 8/1974  | McWilliams        | B65G 67/08 414/398 |
| 3,836,021 | A |   | 9/1974  | McWilliams        |          |

(Continued)

FOREIGN PATENT DOCUMENTS

DE 102009022527 A1 12/2010
DE 102011002710 A1 7/2012

(Continued)

OTHER PUBLICATIONS

PCT Search Report dated Jul. 13, 2011 corresponding to PCT International Application No. PCT/US11/33521 filed Apr. 22, 2011 (13 pages).

(Continued)

Primary Examiner — Kaitlin S Joerger (57) ABSTRACT

Parcel loaders and methods. A parcel loader includes a control system and a conveyor under the control of the control system that is configured to receive a plurality of parcels to be loaded into a container. The parcel loader includes a vertically-adjustable positioning conveyor under the control of the control system and configured to receive the plurality of parcels from the conveyor. The parcel loader includes a plurality of finger conveyors under the control of the control system and configured to place the plurality of parcels in a parcel stack in the container. The finger conveyors can independently extend and retract from the positioning conveyor. The parcel loader can also include upper or lower stack constraints.

17 Claims, 11 Drawing Sheets (56) References Cited

U.S. PATENT DOCUMENTS

| | | | |
|---|---|---|---|
| 4,022,135 A | 5/1977 | Bauman, Jr. et al. | |
| 4,113,122 A | 9/1978 | Lutz | |
| 4,274,789 A | 6/1981 | Martin et al. | |
| 4,281,955 A * | 8/1981 | McWilliams | B65G 21/14 |
| | | | 198/303 |
| 4,284,259 A | 8/1981 | McCaskill | |
| 4,749,325 A | 6/1988 | Hodgetts | |
| 4,842,471 A | 6/1989 | Hodgetts | |
| 4,892,456 A | 1/1990 | Hodgetts | |
| 4,914,993 A | 4/1990 | Fabbri | |
| 4,927,090 A | 5/1990 | Matsumoto | |
| 4,941,794 A | 7/1990 | Hara et al. | |
| 4,991,640 A | 2/1991 | Verkindt et al. | |
| 5,082,415 A | 1/1992 | Hayashi | |
| 5,156,518 A | 10/1992 | VanMatre | |
| 5,163,801 A | 11/1992 | Nordstrom | |
| 5,170,968 A | 12/1992 | Helmner | |
| 5,186,596 A | 2/1993 | Boucher et al. | |
| 5,256,021 A | 10/1993 | Wolf et al. | |
| 5,295,779 A | 3/1994 | Mihalich et al. | |
| 5,327,590 A | 7/1994 | Last | |
| 5,482,425 A | 1/1996 | Podd, Jr. et al. | |
| 5,538,391 A | 7/1996 | Bonnet | |
| 5,573,365 A | 11/1996 | Michalski | |
| 5,697,753 A * | 12/1997 | Aurora | B65G 67/08 |
| | | | 414/398 |
| 5,902,089 A | 5/1999 | Sinn et al. | |
| 6,164,432 A | 12/2000 | Monsees | |
| 6,429,776 B1 | 8/2002 | Alicot et al. | |
| 6,431,346 B1 | 8/2002 | Gilmore et al. | |
| 6,655,893 B2 | 12/2003 | Kelly et al. | |
| 6,663,335 B2 | 12/2003 | Benson et al. | |
| 7,350,244 B1 | 4/2008 | Handley | |
| 8,132,998 B2 | 3/2012 | Paproski | |
| 8,622,199 B2 * | 1/2014 | Windfeld | B65G 41/005 |
| | | | 198/588 |
| 8,651,794 B2 * | 2/2014 | Pippin | B65G 67/08 |
| | | | 414/398 |
| 8,944,239 B2 * | 2/2015 | Campbell | B65G 67/08 |
| | | | 198/588 |
| 9,321,601 B2 | 4/2016 | Pippin | |
| 9,517,492 B2 * | 12/2016 | Schwarzbauer | B65G 37/00 |
| 9,555,982 B2 * | 1/2017 | Girtman | B25J 9/0093 |
| 9,604,797 B2 * | 3/2017 | Heitplatz | B65G 67/08 |
| 9,623,569 B2 | 4/2017 | McCollum et al. | |
| 9,738,463 B2 * | 8/2017 | Wicks | B65G 61/00 |
| 9,738,466 B2 * | 8/2017 | Pippin | B65G 67/24 |
| 10,233,038 B2 * | 3/2019 | Girtman | B25J 9/0093 |
| 2002/0153229 A1 * | 10/2002 | Gilmore | B65G 21/20 |
| | | | 198/568 |
| 2004/0033126 A1 | 2/2004 | Thogersen | |
| 2004/0165980 A1 | 8/2004 | Huang et al. | |
| 2004/0178671 A1 | 9/2004 | Smith | |
| 2005/0098940 A1 | 5/2005 | Malatesta | |
| 2005/0135907 A1 | 6/2005 | Romano et al. | |
| 2005/0162277 A1 | 7/2005 | Teplitxky et al. | |
| 2005/0240498 A1 | 10/2005 | Thaler | |
| 2007/0147980 A1 | 6/2007 | Gerke | |
| 2007/0188324 A1 | 8/2007 | Bailin et al. | |
| 2007/0212208 A1 | 9/2007 | Hansl et al. | |
| 2008/0257692 A1 | 10/2008 | Wallace | |
| 2008/0304947 A1 | 12/2008 | Stout et al. | |
| 2009/0169349 A1 | 7/2009 | Reed | |
| 2009/0269183 A1 | 10/2009 | Richardson et al. | |
| 2010/0066014 A1 | 3/2010 | Brewer, III et al. | |
| 2010/0296902 A1 | 11/2010 | Aschpurwis et al. | |
| 2011/0123307 A1 | 5/2011 | Pillard | |
| 2012/0255835 A1 * | 10/2012 | Date | B65G 67/08 |
| | | | 198/588 |
| 2016/0236881 A1 | 8/2016 | Ito et al. | |
| 2017/0016273 A1 | 1/2017 | Viinonen et al. | |
| 2018/0118476 A1 * | 5/2018 | Bastian, II | B65G 47/90 |
| 2019/0039097 A1 | 2/2019 | Carpenter et al. | |
| 2019/0039494 A1 * | 2/2019 | Carpenter | B65G 67/08 |

FOREIGN PATENT DOCUMENTS

| | | | |
|---|---|---|---|
| EP | -2958838 B1 * | 2/2019 | |
| JP | 2001072226 A | 3/2001 | |
| SU | 1062154 A1 | 12/1983 | |
| WO | 2004050518 A1 | 6/2004 | |
| WO | 2008014532 A1 | 2/2008 | |
| WO | 2011133831 A1 | 10/2011 | |

OTHER PUBLICATIONS

PCT International Search Report dated Jul. 28, 2014 corresponding to PCT International Application No. PCT/US2014/028104 filed Mar. 14, 2014 (10 pages).

Translation of Russian Official Decision of Grant for corresponding Russian Application No. 2012140304 filed Apr. 22, 2011 (13 pages).

* cited by examiner

AUTOMATED CONTAINER LOADER AND METHOD

CROSS-REFERENCE TO RELATED APPLICATIONS

The present application shares some subject matter in common with U.S. Pat. No. 9,738,466 (issued Aug. 22, 2017), U.S. Pat. No. 9,321,601 (issued Apr. 26, 2016), and U.S. Pat. No. 8,651,794 (issued Feb. 18, 2014), each of which is hereby incorporated by reference into the present application as if fully set forth herein.

TECHNICAL FIELD

The present disclosure is directed, in general, to mail and parcel processing techniques.

BACKGROUND OF THE DISCLOSURE

The prior patents incorporated by reference above describe various examples of efficient automated bed-loaded container unloaders and corresponding methods. While automated unloading of a container improves one aspect of an overall parcel and package transportation process, container loading is still largely a manual process. Improved and more efficient systems for loading items into a container or trailer are desirable.

SUMMARY OF THE DISCLOSURE

Various disclosed embodiments include an automated loading system, a parcel loader, and related processes. A parcel loader includes a control system and a conveyor under the control of the control system that is configured to receive a plurality of parcels to be loaded into a container. The parcel loader includes a vertically-adjustable positioning conveyor under the control of the control system and configured to receive the plurality of parcels from the conveyor. The parcel loader includes a plurality of finger conveyors under the control of the control system and configured to place the plurality of parcels in a parcel stack in the container. The finger conveyors can independently extend and retract from the positioning conveyor. The parcel loader can also include upper or lower stack constraints.

In another embodiment, a parcel loading process includes receiving a plurality of parcels to be loaded into a container by a conveyor of a parcel loader. The parcel loading process includes transferring the plurality of parcels from the conveyor to a vertically-adjustable positioning conveyor by the parcel loader. The parcel loading process includes placing the plurality of parcels in a parcel stack in the container, by the parcel loader, using a plurality of finger conveyors, wherein the finger conveyors can independently extend and retract from the positioning conveyor.

In various embodiments, the control system controls the finger conveyors to place the plurality of parcels in the parcel stack according to a predetermined stack topography. Various embodiments include an adjustable-height lower stack constraint configured to retain the parcel stack as the plurality of parcels are being loaded. In various embodiments, the adjustable-height lower stack constraint is formed by a base belt that is attached to the container and that extends from a base portion of the parcel loader to an upper portion of the parcel loader. In various embodiments, the adjustable-height lower stack constraint is formed by a plurality of telescoping or collapsible panels that extend from a base portion of the parcel loader to an upper portion of the parcel loader. In various embodiments, the adjustable-height lower stack constraint is formed by a retractable belt that extends from a base portion of the parcel loader to an upper portion of the parcel loader. In various embodiments, the positioning conveyor is configured to edge one or more of the plurality of parcels against a sidewall. In various embodiments, the positioning conveyor is configured to accumulate multiple ones of the plurality of parcels using a pop-up end rail. In various embodiments, the parcel loader also can perform automatic parcel unloading. In various embodiments, the positioning conveyor comprises a conveying surface with a plurality of directionally-controlled rollers. Various embodiments include an adjustable-height upper stack constraint configured to retain the parcel stack as the plurality of parcels are being loaded. In various embodiments, the parcel loader can raise, lower, pack, and/or sort the parcels before transferring them to the stack.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Parcels are typically loaded into trailers and other containers by people transferring parcels from some form of extendable conveyor and then manually stacking and retaining the items at much lower speed by some means. There are manually-operated extendable unloading and loading conveyors with attached and various extensions ("snorkels") such as described in U.S. Pat. No. 6,431,346, hereby incorporated by reference. Typically, such machines are motorized assist with operators controlling movements by some means and managing stacks and stack spill by labor-intensive methods. Nets or other bar-type load constraints are used to maintain the load and prevent spillage during transport.

Manually loading a trailer or other container can be a grueling job that may be performed at extreme temperatures with relatively low pay. The time required to load or unload a trailer directly affects dock door utilization/productivity and therefore facility size. Problems have arisen with previous attempts to automated trailer loading, including solution cost, cube loss, trailer fleet modification, throughput, staffing, package size/type/formats, loading constraints/configuration, package damage, ease of operation/automation, cost to maintain and ease of retrofitting existing loading dock facilities.

Robotic Flow Loading (RFL) provides high speed and wide spectrum loading of a wide variety of shapes, sizes, weights, porosity, rigidity, bag and other container types. Automatic and high-speed loading, particularly in conjunction with high speed unloading, reduces facility size requirements and can reduce trailer park and wait times allowing for better scheduling and dispatch. High throughput loading is more compatible with throughput of upstream sorters and helps to prevent backup and stoppages caused by overfeeding an operator-paced outbound trailer.

Various disclosed embodiments include an automated container loader system that can intelligently predict or design a loading strategy, automatically load the parcels into a container, and dynamically constrain the parcels as they are loaded. A "parcel," as used herein, is intended to include any item processes as described herein, including boxes, sacks, irregulars, and other items.

Figure 1:
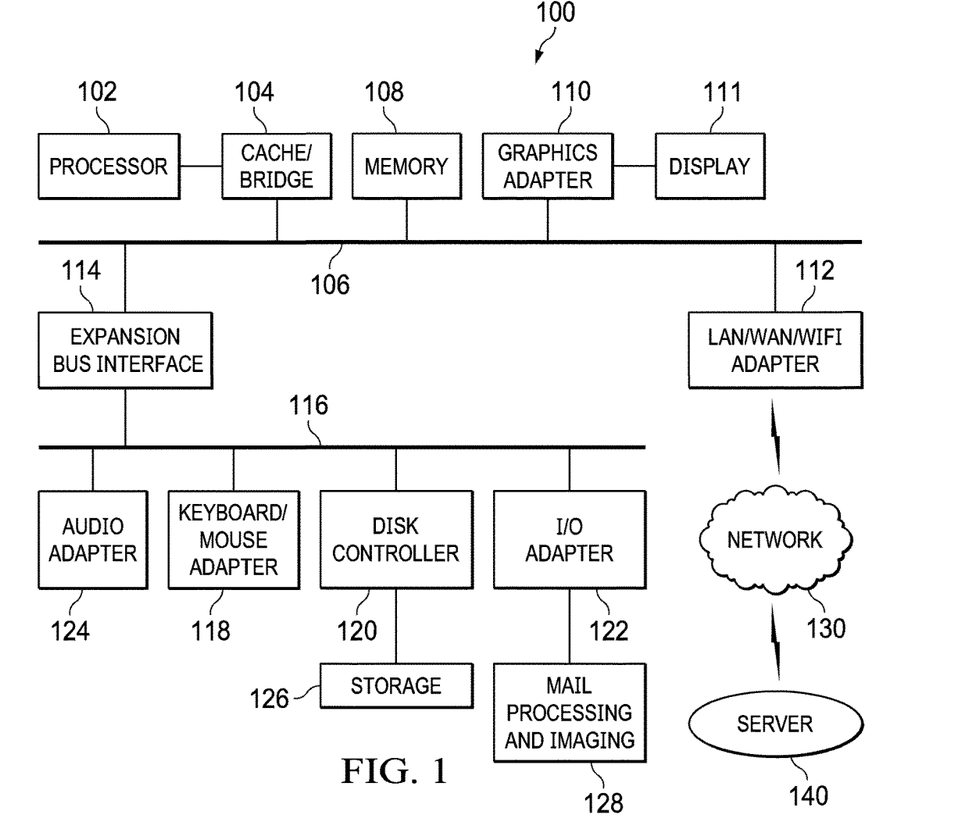
FIG. 1 depicts a block diagram of a data processing system with which an embodiment can be implemented.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces, parcels, or packages in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
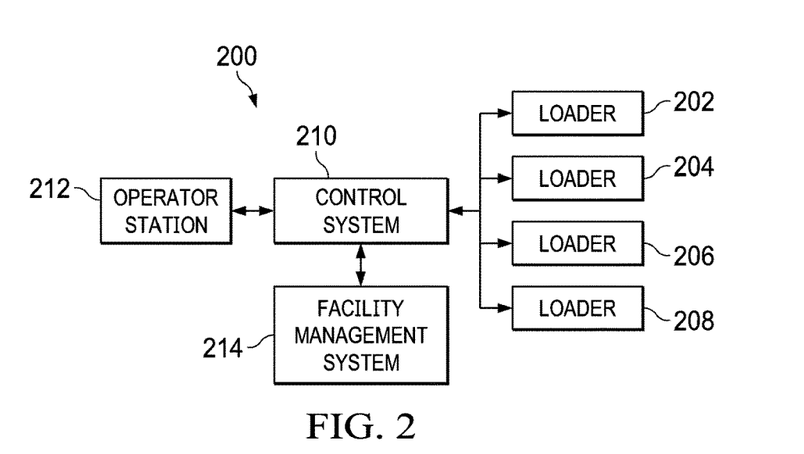
FIG. 2 depicts a schematic view of an automated loading system according to the disclosure.

FIG. 2 depicts an automated loading system 200 according to the disclosure. Loaders 202, 204, 206 and 208 according to the disclosure are controlled by a controller 210. Each of the loaders 202-208 may be positioned at each of four truck docks and operated to load four trailers separately or concurrently. An operator may use an operator console 212 to control the loaders 202-208. The controller 210 may be communicatively coupled to a facility management system 214. The controller 210 sorts parcels by address or identification information sensed from items to be loaded by one or more of the loaders 202-208 and sends the information to the facility management system 214 (or other external system) for its use in routing the items to desired destinations.

While the operator console 212, the controller 210, and the facility management system 214 are depicted in FIG. 2 as separate elements of the automated loading system 200, it will be understood that in other embodiments, this functionality of these elements may be provided in one or two elements. In some embodiments, the automated loading system 200 also includes one or more sensors (not shown in FIG. 2) providing a view of one or more of the loaders 202-208 and one or more corresponding trailers or other containers. In such embodiments, the controller 210 is further adapted to control a loader positioning mechanism to position the loader in a desired position relative to the trailer, prior to initiating a loading process.

Disclosed embodiments include a novel way to constrain stacks or parcels even as they grow in height and volume and then afterwards during transport. Such embodiments can use one or more raiseable and moveable surfaces, such as a belt wrapped over a moving rail, to prevent stacked parcels from spilling during loading and afterwards during transport. In some configurations, the same belt or surface can also be used to facilitate automate unloading as described in the patents incorporated by reference above.

Various embodiments include processes to resolve and update predicted stack topography with real time measurement of parcel size, parcel presence, stack topography (including voids), and ability to disturb stacks with applied forces to help close gaps that form, such as by using the finger conveyors described herein. Presorted parcels are merged on command to blended loads for improving density, stability, care and position within trailer for time priority unloads. Predicting and designing a stack topography for loading into a container can be performed, for example, using "load building" techniques described in United States Patent Publication 2019/0039097, hereby incorporated by reference, and other techniques as understood by those of skill in the art.

Disclosed embodiments can use a trailer/container belt or other device as a raiseable moveable lower stack constraint to constrain stacks as they are constructed and later to automatically constrain load during transport. To achieve high speed and acceptable load density the control system can use a density algorithm to dynamically resolve best placement for a highest density result when comparing prediction from simulations, parcel size, robotic flow load sensory information, and current measurement of stack voids/topography.

Figure 3:
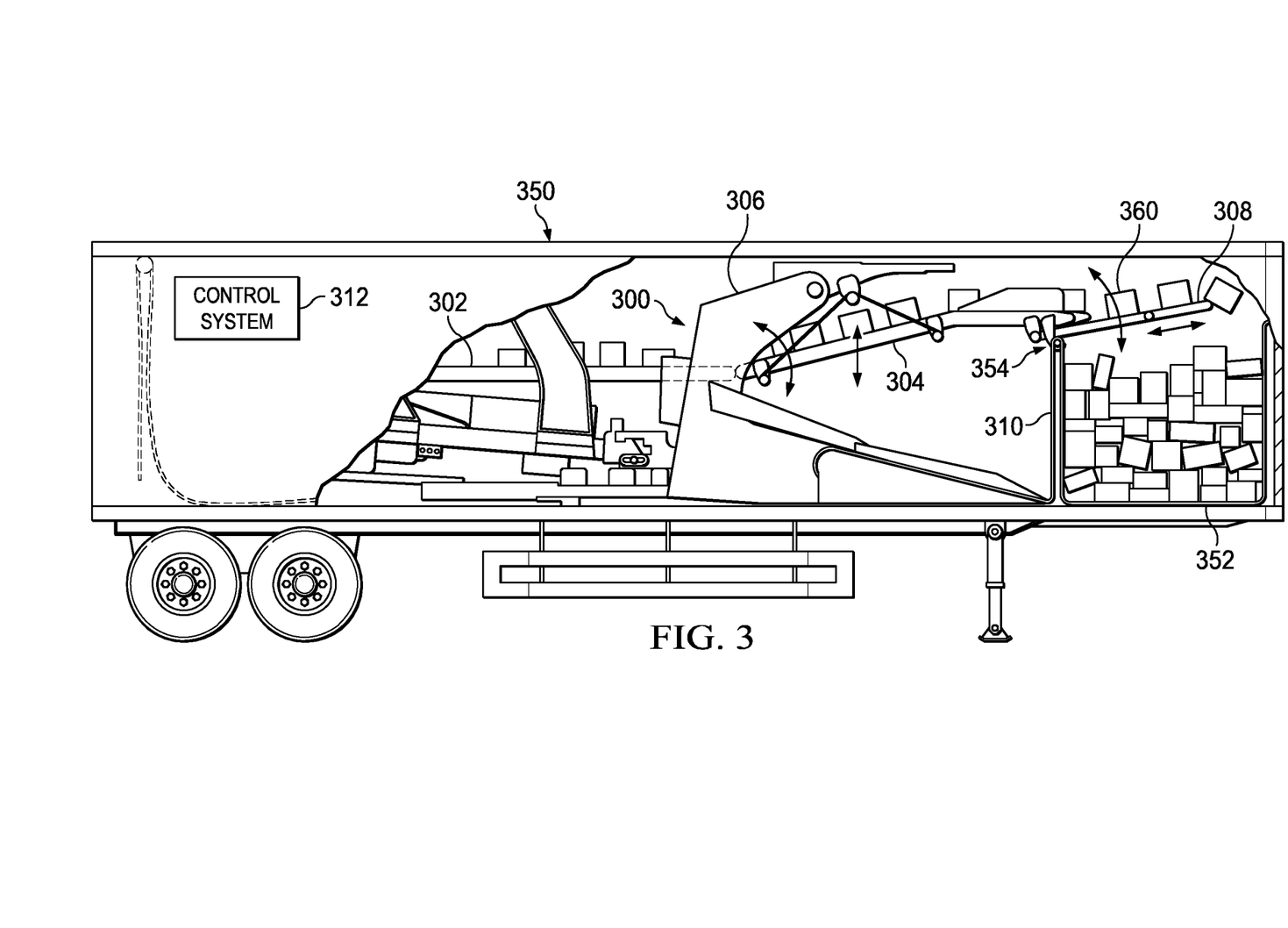
FIG. 3 illustrates some features of an automatic loader that can be included in various disclosed embodiments.

FIG. 3 illustrates some features of an automatic loader that can be included in various disclosed embodiments. In this example, a loader 300 is loading parcels 360 into a trailer/container 350. In this example, container 350 includes a base belt 352, such as described in U.S. Pat. No. 9,738,466, that is removably affixed to an interior wall of container 350 and upon which the parcels 360 are stacked as they are loaded. In some cases, after the container is loaded, the door end of base belt 352 can be removably affixed at the door end of the container to act as a retaining wall so that the door can be more easily opened after transport without spilling parcels 360 and to secure parcels during transit. Such an attachment of the base belt 352 can have other advantages, such as to prevent "fold under" of the belt, which can cause delays in using the base belt 352 in unloading processes, and to present the end of the base belt 352 to assist connection to an automatic unloader.

Loader 300 includes a conveyor 302 that can be implemented using any combination of belts, rollers, or other mechanical conveying devices configured to transport parcels 360 into the container 350 for loading. Conveyor 302 can include or receive parcels from an extendible conveyor that transports the parcels 360 from the dock or other location. Conveyor 302 is under the control of the control system 312 and configured to receive a plurality of parcels to be loaded into a container.

Conveyor 302 feeds parcels to positioning conveyor 304. Positioning conveyor 304 is a vertically-adjustable conveyor that can raise and lower as needed to deposit parcels 360 on a stack in the container 350 without dropping them from an excessive height or without colliding with already-stacked parcels. Positioning conveyor can raise, lower, pack, and/or sort the parcels as needed for placement on the stack. In this example, positioning conveyor 304 is supported by support arm 306, which in this example enables the loader 300 to raise and lower the end of positioning conveyor 304. Positioning conveyor 304 can be implemented as any combination of belts, rollers, or other conveying means. In particular, positioning conveyor 304 can include directionally-controlled rollers that can move each parcel 360 along the width of the positioning conveyor 304 for precise placement for loading, and can "edge" selected parcels by moving them to either side of the positioning conveyor 304 (where sidewalls may or may not be used) so that the entire width of the container 350 can be used. Positioning conveyor 304 can therefore "edge" the parcels to each edge and can manipulate the parcels along the width to accumulate a "line" of parcels before they are transferred to the stack of parcels. By moving each of the parcels as needed from side-to-side, and accumulating lines of parcels before transfer to the finger conveyors discussed below, the positioning conveyor can effectively pack and sort the parcels as needed so that they can be placed most efficiently according to the topography of the current stack of parcels. The positioning conveyor 304 is under the control of the control system and configured to receive the plurality of parcels from the conveyor.

In this example, positioning conveyor 304 feeds parcels to one or more "finger" conveyors 308. Finger conveyors 308 are configured to extend and retract from the end of positioning conveyor 304 so that parcels 360 can be precisely placed on the stack at different distances from the end of positioning conveyor 304, and are used to transfer the parcels 360 from the loader 300 to the stack of parcels in the container 350. Finger conveyors 308 can also include sensors to allow the loader 300 to "feel" the current status of the stack of parcels 360, including its height, compressibility, stability, and other aspects, and to allow the loader 300 to detect and respond to collisions between the finger conveyors 308 and the parcels 360. Finger conveyors 308 can measure the bed space of the stack of parcels and the vertical clearance between the stack and the roof of container 350. There may be multiple, independently controllable finger conveyors 308 across the width of the positioning conveyor 304 so that different parcels 360 at different positions across positioning conveyor 304 can be placed at different depths within the container 350 on the stack of parcels 360, or a "line" of parcels can be transferred together, neatly, onto the existing stack of parcels. Finger conveyors 308 can be implemented as any combination of belts, rollers, or other conveying means. Each of the finger conveyors 308 is under the control of the control system 312 and configured to place the plurality of parcels in a parcel stack in the container, and each of the finger conveyors can independently extend and retract from the positioning conveyor. The control system 312 can control the finger conveyors to place the plurality of parcels in the parcel stack according to a predetermined stack topography.

Control system 312 designs the stack being built in the container based on the physical characteristics of each of the parcels. Loader 300 can then build these stacks. The control system 312 controls the positioning conveyor 304 to sort, pack, and/or elevate parcels for best fitment to the predetermined topography of the current stack (and pre-designed stack). At the same time, the control system 312 receives sensor updates from finger conveyors 308 to update its model of the actual current physical stack, and uses this information to operate the positioning conveyor 304 and the finger conveyors 308 to most efficiently place each of the parcels on the stack.

Note, in this example, that the base belt 352 has been fed over a roller or other attachment 354 on positioning conveyor 304. In this way, loader 300 uses the base belt 352 as an adjustable-height "wall" lower stack constraint 310 to retain the stack of parcels 360 as the parcels are being loaded. The lower stack constraint 310 can be raised and lowered by positioning conveyor 304, and moves with loader 300 as loader 300 moves into and out of the container 350. In a loading operation, as loader 300 stacks parcels in the container 350, loader retains the stack of parcels using the adjustable-height lower stack constraint 310. As the stack of parcels is built and fills the container 350, the loader 300 backs out of the container 350, moving the adjustable-height lower stack constraint 310 further from the back lower stack constraint of container 350 (and closer to the door of container 350), enlarging the area for additional parcels 360 to be added to the stack.

Of course, in other embodiments, the lower stack constraint 310 can be implemented using a separate belt, netting, telescoping or collapsible panels, or other mechanical elements that extend between the base of loader 300 and positioning conveyor 304, so that the same adjustable-height lower stack constraint result is accomplished. In other cases, the lower stack constraint 310 extends between the base of the loader 300 and a separate upper arm of the loader 300 (rather than to the positioning conveyor 304). Lower stack constraint 310 can be implemented in a number of ways to produce an adjustable-height retaining lower stack constraint that is configured to retain the stack of parcels 360 (particularly a lower portion of the stack) while still allowing the loader 300 to add parcels to the stack. In general, the adjustable-height lower stack constraint can formed by a base belt that is attached to the container and that extends from a base portion of the parcel loader to an upper portion of the parcel loader, or by a plurality of telescoping or collapsible panels, a separate retractable belt, netting, or other elements that extend from a base portion of the parcel loader to an upper portion of the parcel loader. Similar techniques, in some embodiments, can be used to implement an upper stack constraint as described in more detail herein.

Control system 312, including one or more controllers/processors, memories, and other elements as described herein, controls the operation of loader 300. The actual physical location of control system 312 can be anywhere on the loader 300, on the dock or base, implemented as in control system 210 to control multiple loaders 300, or otherwise, and control system 312 is configured to control the loader 300 to perform processes as described herein.

Figure 4:
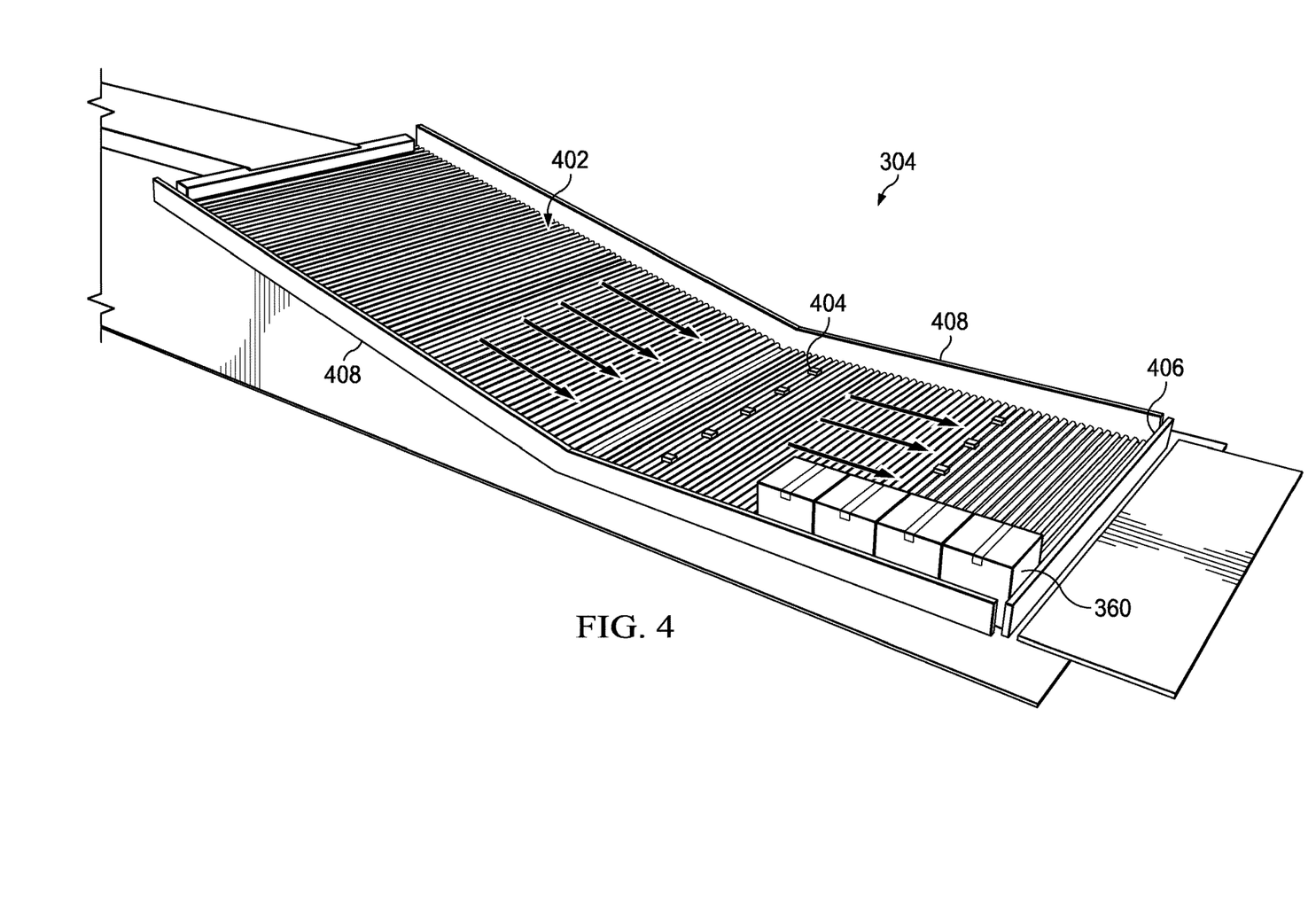
FIG. 4 illustrates an example of some features that can be included in a positioning conveyor in accordance with various disclosed embodiments.

FIG. 4 illustrates an example of some features that can be included in positioning conveyor 304 in accordance with various disclosed embodiments. Loader 300 can model the intended stack of parcels 360 prior to or as they are transported according to such factors as size, weight, shape, and other physical characteristics to produce a stable and efficiently-packed stack. Parcels 360 are conveyed along conveying surface 402, which can include directionally-controlled rollers 404, so that each parcel 360 can be precisely placed along the length and width of the positioning conveyor 304. Positioning conveyor 304 can include a retractable pop-up end rail 406 where parcels 360 can be accumulated before being moved to finger conveyors 308. Positioning conveyor 304 can include bed fence sidewall 408 so that parcels 360 can be "edged" to the sides to use the entire width of the container 350.

In an example loading operation, loader 300 can edge a first parcel or series of parcels 360 on a right sidewall 408 and the end rail 406. Loader 300 can then edge the next parcel or series of parcels 360 on a left sidewall 408 and the end rail 406. Loader 300 can then, for example, fill in the spots between the two front end parcels by moving other parcels between them. By modeling the stack of parcels 360, the loader 300 can use positioning conveyor 304 to temporarily accumulate or buffer individual parcels 360 so that they can be assembled on positioning conveyor 304, transferred to finger conveyors 308, and placed in the stack in the most efficient manner possible.

While many regularly-shaped parcels can be intelligently loaded, other parcels are typically "flow loaded," where neat, precise stacking is not possible. Loader 300 can precisely place parcels in all three dimensions, by using positioning conveyor 304 to place each parcel in a lateral position on the loader 300, using finger conveyors 308 (and the movement of the loader 300 itself) to place each parcel at selected depth in the container or stack, and using the adjustable height of the positioning conveyor 304 to place parcels at a selected height on the stack. Loader 300 can also use these techniques to, for example, build a stack with a stable base and stable walls, leaving space for irregular parcels to be flow-loaded on top of the stacks or in any voids in the stack.

Figure 5:
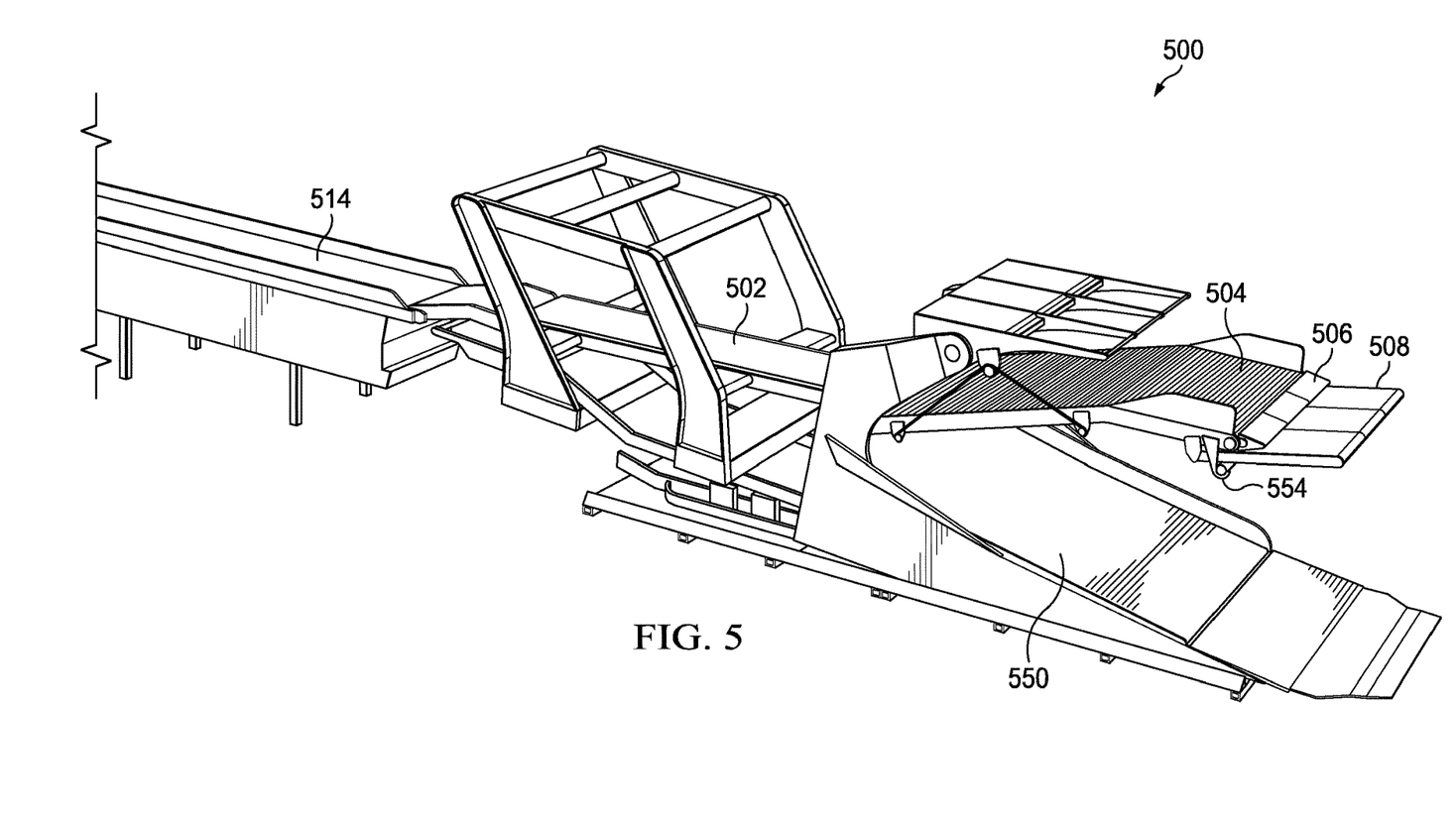
FIG. 5 illustrates another example of a loader in accordance with disclosed embodiments.

FIG. 5 illustrates another example of a loader 500 in accordance with disclosed embodiments, in this example as a combined system with an automatic unloader as described in the applications incorporated by reference herein.

This example illustrates an extendible conveyor 502 that delivers parcels to conveyor 502, the main input to loader 500, to be stacked in a container. Parcels are transported by conveyor 502 to positioning conveyor 504, and as they are transported, they are raised to the adjustable stacking height of positioning conveyor 504. At the end of positioning conveyor 504, the parcels can be edged against sidewalls and otherwise organized and accumulated before being stacked, for example using a retractable pop-up end rail 506. When the parcels are in position to be stacked, the pop-up end rail 506 is retracted and the parcels are transferred to finger conveyors 508 for precise manipulation and placement on the stack inside the container. The positioning conveyor is therefore configured to edge one or more of the plurality of parcels against a sidewall, and to accumulate multiple ones of the plurality of parcels using the pop-up end rail Attachment 554 on positioning conveyor 504 is a connection point for a base belt or other structure to form an adjustable-height lower stack constraint as described herein (not shown in this figure).

The bottom portion 550 of this example generally corresponds to the automatic unloader system and its elements, such as a nose ramp, nose conveyor, pinch rollers, tensioning rollers, and other elements usable when the loader 500 is in an unloading mode of operation, as described in the applications incorporated by reference herein. By combining the elements of the automatic loader as described herein with the elements of an automatic unloader, a single system at a single door of a facility can efficiently be controlled to perform unloading or loading operations as necessary. In particular embodiments, this can include a process of automatically unloading parcels from a container and delivering them to a parcel processing system in a facility, switching modes of operation, then receiving parcels from the parcel processing system and automatically loading them into the container. In various embodiments, the parcel loader also can perform automatic parcel unloading.

Figure 6:
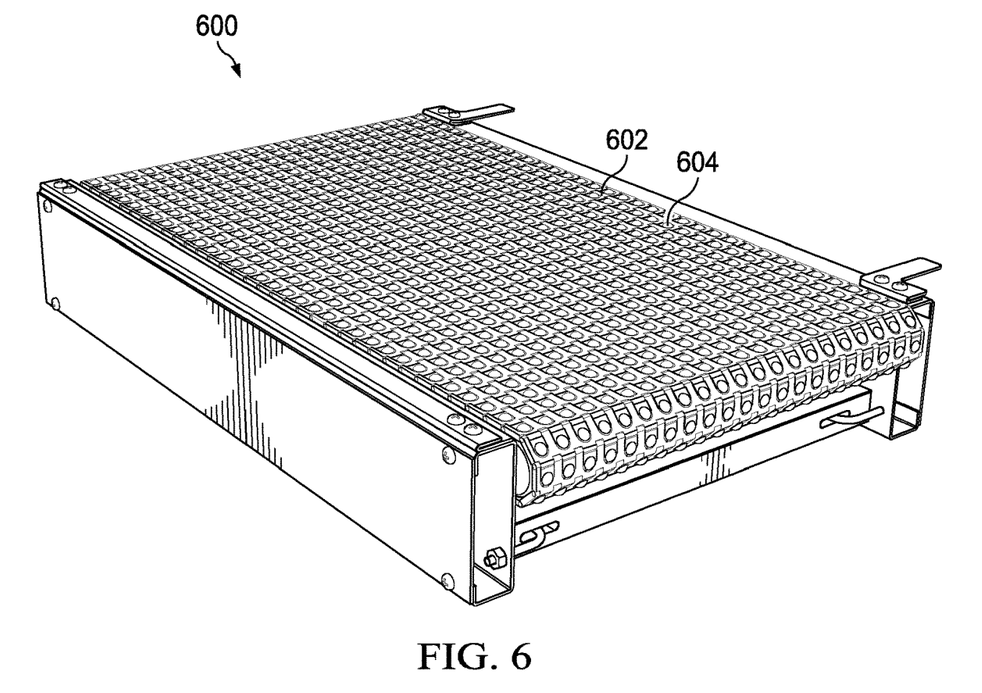
FIG. 6 illustrates an example of a conveyor usable to implement a positioning conveyor in accordance with disclosed embodiments.

FIG. 6 illustrates an example of a conveyor 600 that includes conveying surface 602, which can include directionally-controlled rollers 604, usable to implement positioning conveyor 304, so that it can perform functions of a sort, edge, and right-angle accumulation conveyor as described herein.

Figure 7:
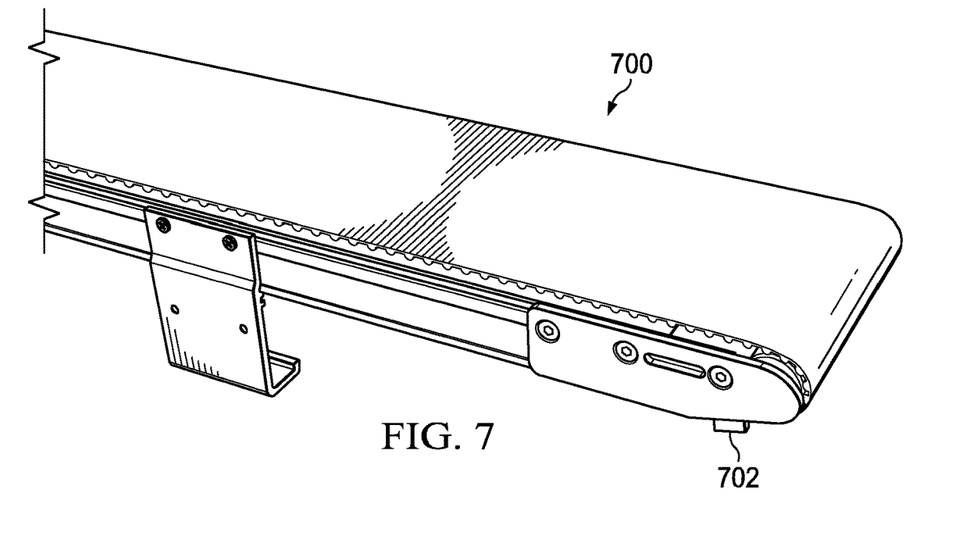
FIG. 7 illustrates an example of a narrow and light extension conveyor that is usable to implement one or more of the plurality of finger conveyors in accordance with disclosed embodiments.

FIG. 7 illustrates an example of a narrow and light extension conveyor 700, usable to implement one or more of the plurality of finger conveyors 308. Each extension conveyor 700 can be individually controlled and can be independently extended from or retracted into the loader 300 for precise placement of parcels. The end and/or other locations of extension conveyors 700 can each have one or more sensors 702 for "feeling" the physical characteristics of the container, stack, and parcels as described herein.

Figure 8A:
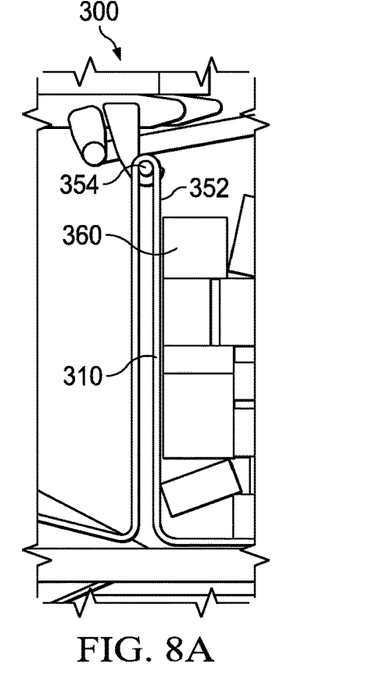
FIGS. 8A-8C illustrate examples of different possible implementations of an adjustable-height lower stack constraint in accordance with disclosed embodiments.
Figure 8B:
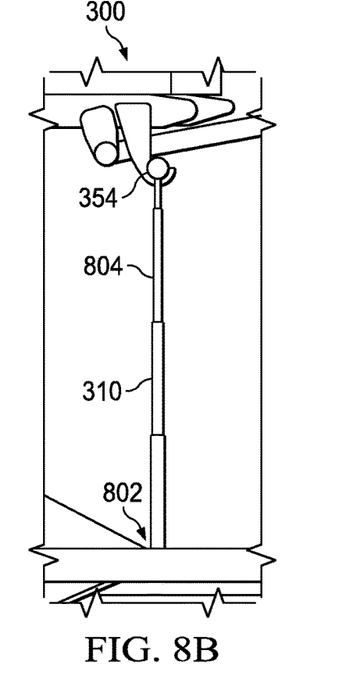
Figure 8C:
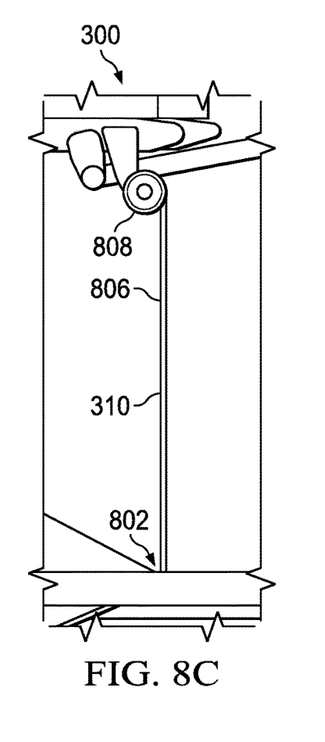

FIGS. 8A-8C illustrate examples of different possible implementations of adjustable-height lower stack constraint 310 in accordance with disclosed embodiments.

FIG. 8A illustrates the use of a base belt 352 as the lower stack constraint 310 in accordance with disclosed embodiments, as illustrated in FIG. 3. In this example, base belt 352 extends between the base 802 of the loader 300 and an attachment point 354 on the upper portion of the loader 300 (such as on the positioning conveyor), forming the lower stack constraint 310. Lower stack constraint 310 retains parcels 360 in their stacked position as the loader operates and continues building the stacks.

FIG. 8B illustrates the use of telescoping or collapsible panels 804 as the lower stack constraint 310 in accordance with disclosed embodiments. In this example, panels 804 extend between the base 802 of the loader 300 and an attachment point 354 on the upper portion of the loader 300 (such as on the positioning conveyor), forming the lower stack constraint 310. Lower stack constraint 310 retains parcels in their stacked position as the loader operates and continues building the stacks.

FIG. 8C illustrates the use of a separate retractable belt 806 as the lower stack constraint 310 in accordance with disclosed embodiments. In this example, belt 806 extends between the base 802 of the loader 300 and a roller 808 on the upper portion of the loader 300 (such as on the positioning conveyor), forming the lower stack constraint 310. Of course, in other embodiments, this can be reversed, wherein the roller 808 is on the base 802 of the loader 300 and the retractable belt is removably attached to the upper portion of the loader 300. Belt 806 extends from and retracts to roller 808 so that it forms the adjustable height lower stack constraint 310. Lower stack constraint 310 retains parcels in their stacked position as the loader operates and continues building the stacks.

Figure 9:
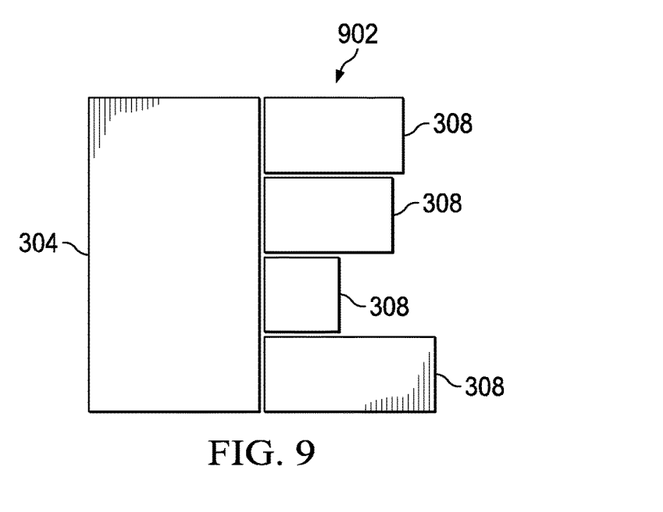
FIG. 9 illustrates a top schematic view of a positioning conveyor with a plurality of finger conveyors in accordance with disclosed embodiments.

FIG. 9 illustrates a top schematic view of a positioning conveyor 302 with a plurality of finger conveyors 308. This figure illustrates that each of the plurality of finger conveyors 308 can independently extend and retract from the positioning conveyor 302 for precise placement of parcels. Some or all of the finger conveyors 308 can include one or more sensors 902 configured to sense the current status of the stack of parcels, including its height, compressibility, stability, and other aspects, or to sense other physical characteristics of the container, stack, and parcels, and to allow the control system to detect and respond to collisions between the finger conveyors 308 and the parcels.

Figure 10:
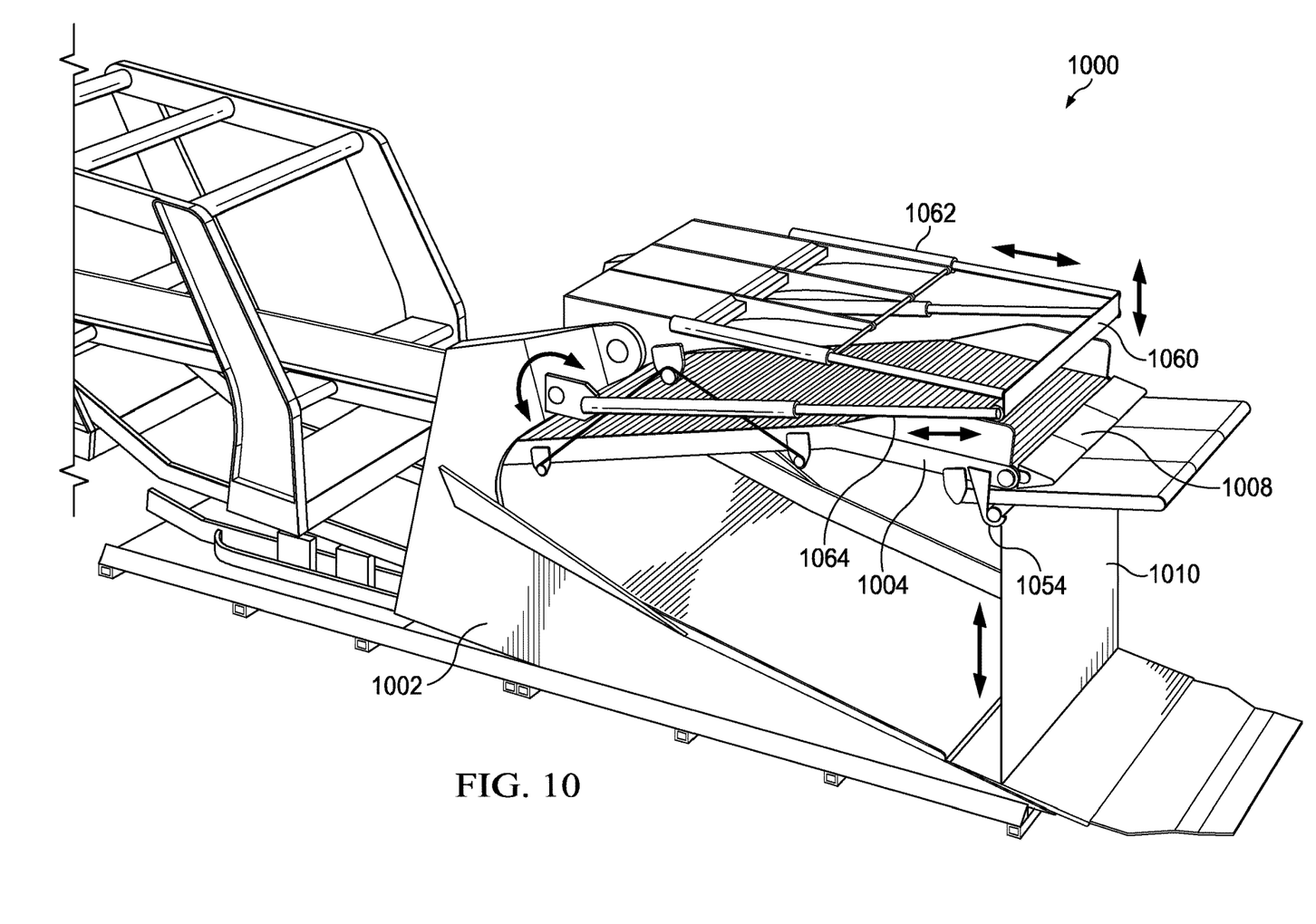
FIGS. 10-13 illustrate an automatic loader with an upper stack constraint in accordance with disclosed embodiments.

FIG. 10 illustrates a view of an automatic loader 1000 with an upper stack constraint 1160 in accordance with disclosed embodiments. In this example, the loader 1000 has a lower stack constraint 1010 as described herein, extending between the base 1002 of the loader 1000 and an attachment point 1054 on the upper portion of the loader 1000, in this example on positioning conveyor 1004. Lower stack constraint 1000 can be connected to base 1002 using, for example, a tension spool.

This example also illustrates an upper stack constraint 1060, which can be implemented using any of the techniques described herein for a lower stack constraint. Upper stack constraint 1060 can be supported at its upper end on a powered extendable slide frame 1062 on the upper end of automatic loader 1000. Extendable slide frame 1062, under control of a control system as described herein, can extend and retract from the loader 1000 to place the upper stack constraint 1060 in position to constrain the stack in the container at positions above the level of the positioning conveyor 1004, much as the lower stack constraint 1010 constrains the stack at positions lower than the level of the positioning conveyor 1004. Upper stack constraint 1060 be connected to powered extendable slide frame 1062 using, for example, a tension spool.

In various embodiments, the upper stack constraint can be attached to the upper and outward frame of the loader (toward the stack face) and can telescope or extend downward toward the lower stack constraint. The control system can determine the position and aperture of the opening between the upper stack constraint and the lower stack constraint.

The lower end of the upper stack constraint 1060 can be connected to the end of a powered extendable and rotatable upper constraint control arm 1064. Upper constraint control arm 1064 can extend or retract upper stack constraint 1060 with respect to extendable slide frame 1062 under control of the control system so that it can constrain any portion of the stack already in the container that is above the level of the lower stack constraint, including between the finger conveyors 1008 and the stack already in place in the container. That is, in various embodiments, the upper stack constraint 1060 extends from the extendable slide frame 1062, near the top of the container being loaded, to the upper constraint control arm 1064, to form a "wall" restraining any existing stack so that loader 1000 can place additional parcels in the container as the next portion of the stack. Where lower stack constraint 1010 retains the current stack at levels below the finger conveyors 1008 at the end of positioning conveyor 1004, the upper stack constraint 1060 can constrain the current stack at any level above the lower stack constraint 1010, including adjacent to finger conveyors 1008.

Figure 11:
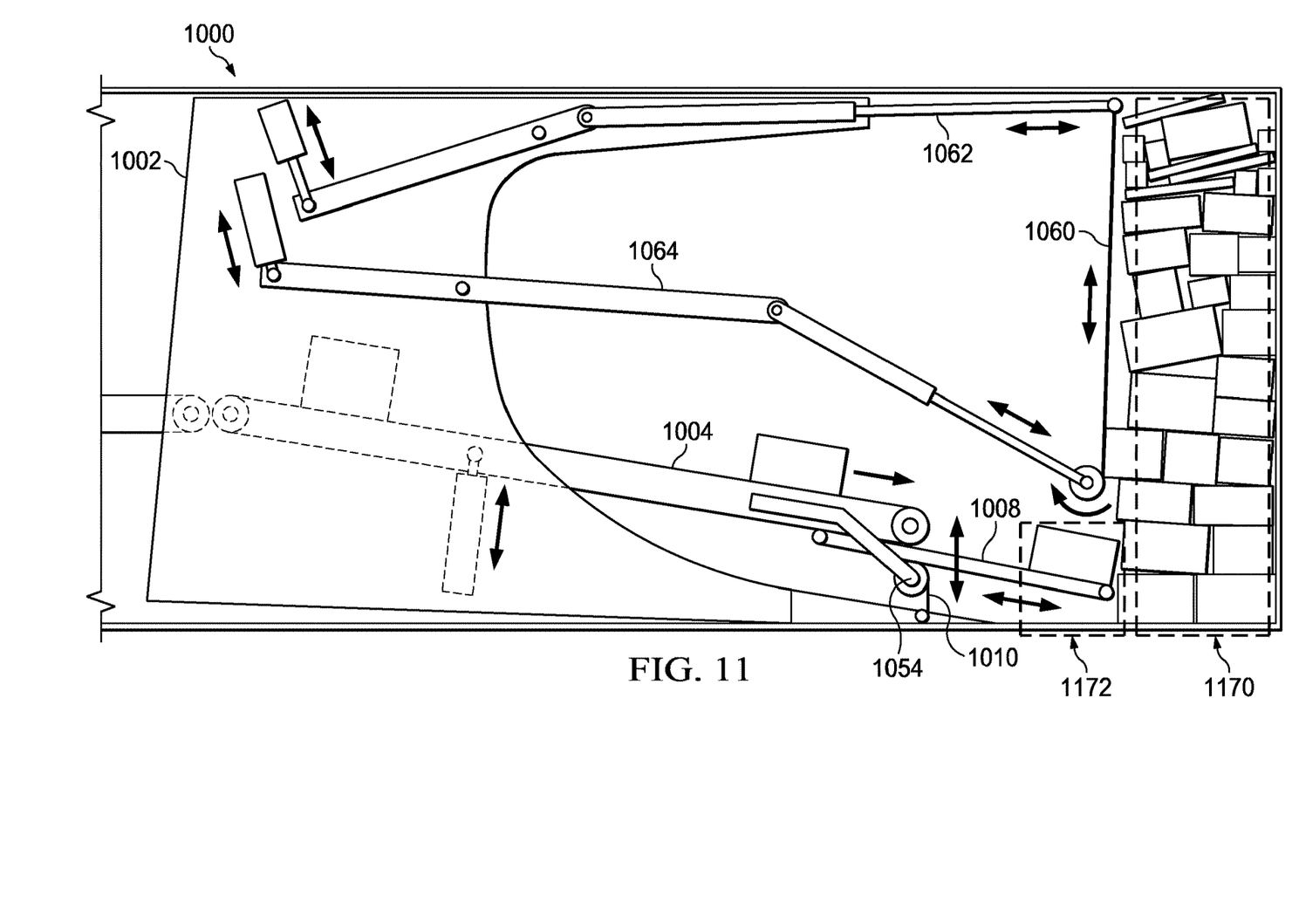

FIG. 11 illustrates a view of portions of automatic loader 1000 in accordance with disclosed embodiments. In this example, the existing stack 1170 in the container is restrained by upper stack constraint 1060 while the current stack 1172 is just started with a first parcel. Lower stack constraint 1010 is collapsed/retracted, as is it not needed to restrain any portion of existing stack 1170 or current stack 1172 while the parcel is deposited into the current stack 1172 by finger conveyors 1008. Other labeled elements are consistent with their description in other figures.

Figure 12:
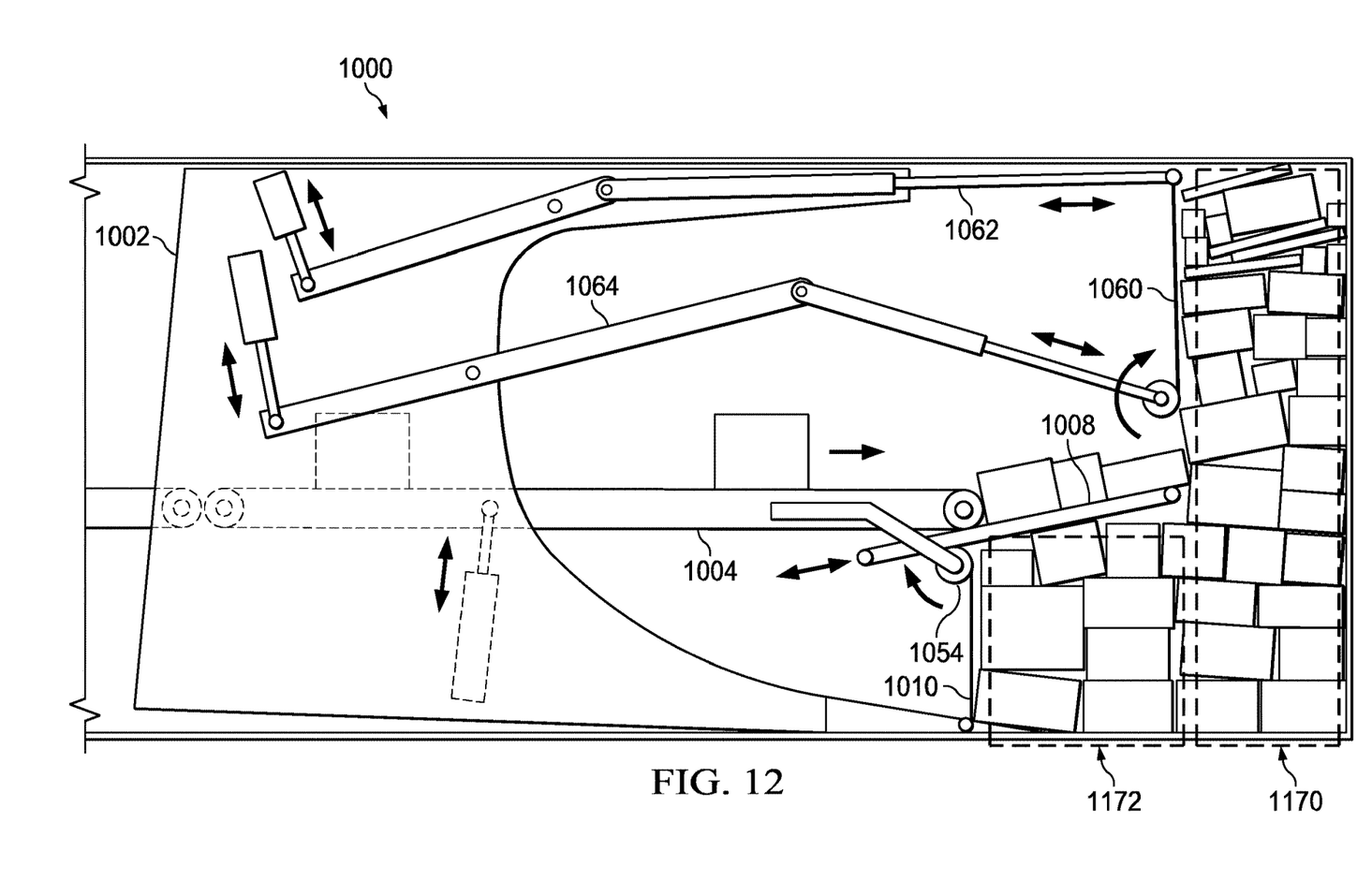

FIG. 12 illustrates a view of portions of automatic loader 1000 in accordance with disclosed embodiments. In this example, the existing stack 1170 in the container is restrained by upper stack constraint 1060 while the current stack 1172 is being built. Lower stack constraint 1010 is extended sufficient to restrain the lower portion of current stack 1172 below the level of the finger conveyors 1008 while parcels are deposited onto the top of current stack 1172 by finger conveyors 1008. Other labeled elements are consistent with their description in other figures.

Figure 13:
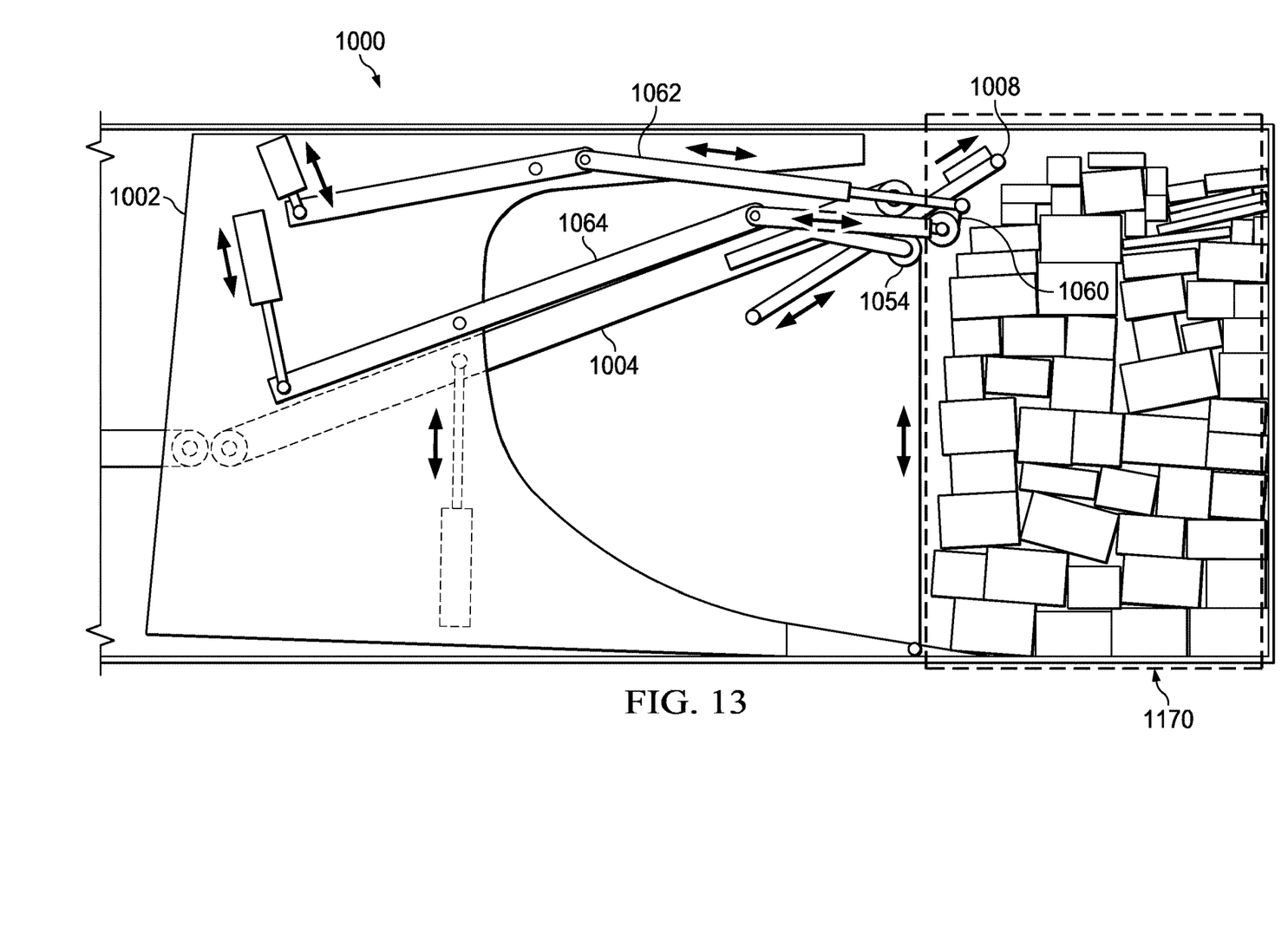

FIG. 13 illustrates a view of portions of automatic loader 1000 in accordance with disclosed embodiments. In this example, the existing stack 1170 in the container is restrained by lower stack constraint 1010 a parcel is being deposited on top of the existing stack 1170. Lower stack constraint 1010 is extended to restrain the entire current existing stack 1172 below the level of the finger conveyors 1008 while the parcel is deposited onto the top of current stack 1172 by finger conveyors 1008. Upper stack constraint 1060 is completely collapsed/retracted, and is moved below the finger conveyors 1108 so that the parcels can be stacked to the top of the container. Other labeled elements are consistent with their description in other figures.

As illustrated in FIG. 13, the finger conveyors 1008 can load over the top edge of the upper stack constraint 1060. When top of stack loading is complete upper stack constraint 1060 can maneuver past the finger conveyors 1008 under auto control and be positioned to the near the container roof to prevent spillage of the uppermost parcels. The lower end of the upper stack constraint 1060 can move downward toward the floor toward lower stack constraint 1010. Where the stack constraints are implemented using belts, the belt action of both the lower and upper stack constraints are winding and unwinding over the end of the parcels (stack face) to eliminate relative motion and prevent friction forces/binding of the stack constraint belts scrubbing against the parcels which are pushing on the stack constraints as they raise and/or lower.

Various embodiments of the automatic loader system can be implemented as described in any of the examples set forth herein, using any combination of described elements or processes.

Figure 14:
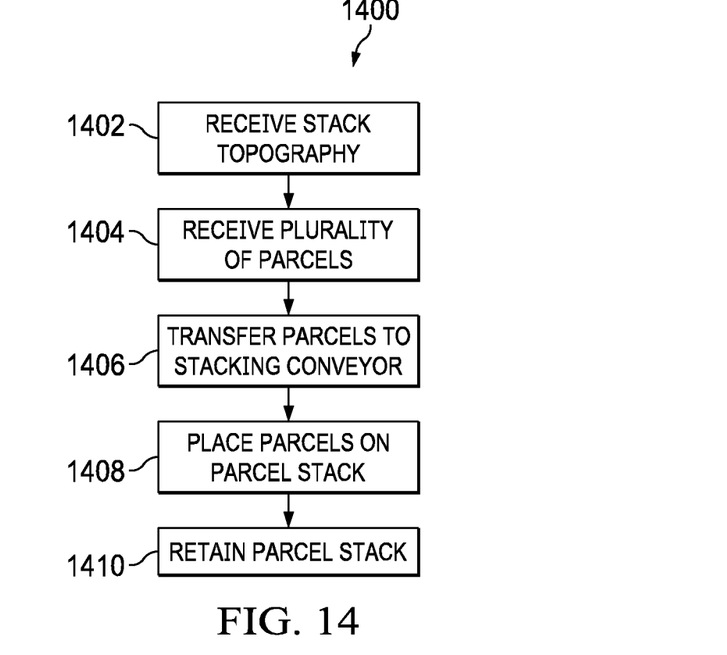
FIG. 14 illustrates a flowchart of a process in accordance with disclosed embodiments.

FIG. 14 illustrates a flowchart of a process 1400 in accordance with disclosed embodiments that can be performed, for example, by an automatic loader as described herein, under control of its control system, and can be combined with any of the other options or features described herein.

The loader can receive a predetermined stack topography for a plurality of parcels to be stacked in a container (1402). "Receiving," in this case, can include loading from storage, receiving from another device or process, or actually determining the stack topography from physical characteristics of the plurality of parcels.

The loader can receive the plurality of parcels to be loaded into a container by a conveyor (1404).

The loader can transfer the plurality of parcels from the conveyor to a vertically-adjustable positioning conveyor (1406). As part of this process, the loader can raise or lower the positioning conveyor to the appropriate height for placing the parcels on a parcel stack. As part of this process, the loader can use the positioning conveyor to edge one or more of the plurality of parcels against a sidewall and can accumulate multiple ones of the plurality of parcels using a pop-up end rail.

The loader can place the plurality of parcels in or on the parcel stack in the container using a plurality of finger conveyors (1408). The finger conveyors can independently extend and retract from the positioning conveyor. The finger conveyors can place the plurality of parcels in the parcel stack according to the predetermined stack topography.

As the parcels are being received and placed on the parcel stack, the loader can retain the parcel stack using an adjustable-height lower stack constraint and/or upper stack constraint, as described herein (1410).

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein and in the incorporated applications can be combined in any number of implementations.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A parcel loader, comprising:
    a control system;
    a conveyor under the control of the control system and configured to receive a plurality of parcels to be loaded into a container;
    a vertically adjustable positioning conveyor under the control of the control system and to receive the plurality of parcels from the conveyor;
    a plurality of finger conveyors under the control of the control system and configured to place the plurality of parcels in a parcel stack in the container, wherein the finger conveyors can independently extend and retract from the positioning conveyor; and
    an adjustable-height lower stack constraint configured to retain the parcel stack as the plurality of parcels are being loaded,
    wherein the adjustable-height lower stack constraint is formed by a base belt that is attached to the container and that extends from a base portion of the parcel loader to an upper portion of the parcel loader, by a plurality of telescoping or collapsible panels that extend from a base portion of the parcel loader to an upper portion of the parcel loader, or by a retractable belt that extends from a base portion of the parcel loader to an upper portion of the parcel loader.

2. The parcel loader of claim 1, wherein the control system controls the finger conveyors to place the plurality of parcels in the parcel stack according to a predetermined stack topography.

3. The parcel loader of claim 1, wherein the positioning conveyor is configured to raise or lower the plurality of parcels before transferring the plurality of parcels to the finger conveyors.

4. The parcel loader of claim 1, further comprising an adjustable-height upper stack constraint configured to retain the parcel stack as the plurality of parcels are being loaded.

5. The parcel loader of claim 1, wherein the positioning conveyor is configured to edge one or more of the plurality of parcels against a sidewall.

6. The parcel loader of claim 1, wherein the positioning conveyor is configured to accumulate multiple ones of the plurality of parcels using a pop-up end rail.

7. The parcel loader of claim 1, wherein the parcel loader also can perform automatic parcel unloading.

8. The parcel loader of claim 1, wherein the positioning conveyor comprises a conveying surface with a plurality of directionally-controlled rollers.

9. A parcel loading process, comprising:
    receiving a plurality of parcels to be loaded into a container by a conveyor of a parcel loader;
    transferring the plurality of parcels from the conveyor to a vertically-adjustable positioning conveyor by the parcel loader; and
    placing the plurality of parcels in a parcel stack in the container, by the parcel loader, using a plurality of finger conveyors, wherein the finger conveyors can independently extend and retract from the positioning conveyor,
    wherein the parcel loader includes an adjustable-height lower stack constraint configured to retain the parcel stack as the plurality of parcels are being loaded, and
    wherein the adjustable-height lower stack constraint is formed by a base belt that is attached to the container and that extends from a base portion of the parcel loader to an upper portion of the parcel loader, by a plurality of telescoping or collapsible panels that extend from a base portion of the parcel loader to an upper portion of the parcel loader, or by a retractable belt that extends from a base portion of the parcel loader to an upper portion of the parcel loader.

10. The parcel loading process of claim 9, wherein the finger conveyors place the plurality of parcels in the parcel stack according to a predetermined stack topography.

11. The parcel loading process of claim 9, further comprising raising or lowering the plurality of parcels before transferring the plurality of parcels to the finger conveyors.

12. The parcel loading process of claim 9, wherein the parcel loader includes an adjustable-height upper stack constraint configured to retain the parcel stack as the plurality of parcels are being loaded.

13. The parcel loading process of claim 9, wherein the positioning conveyor is configured to edge one or more of the plurality of parcels against a sidewall.

14. The parcel loading process of claim 9, wherein the positioning conveyor is configured to accumulate multiple ones of the plurality of parcels using a pop-up end rail.

15. The parcel loading process of claim 9, wherein the parcel loader also can perform automatic parcel unloading.

16. The parcel loading process of claim 9, wherein the positioning conveyor comprises a conveying surface with a plurality of directionally-controlled rollers.

17. A parcel loader, comprising:
    a control system;
    a conveyor under the control of the control system and configured to receive a plurality of parcels to be loaded into a container;
    a vertically adjustable positioning conveyor under the control of the control system and to receive the plurality of parcels from the conveyor; and
    a plurality of finger conveyors under the control of the control system and configured to place the plurality of parcels in a parcel stack in the container, wherein the finger conveyors can independently extend and retract from the positioning conveyor,
    wherein the positioning conveyor is configured to accumulate multiple ones of the plurality of parcels using a pop-up end rail.

* * * * *